United States Patent [19]

Jeffers

[11] Patent Number: 4,748,528
[45] Date of Patent: May 31, 1988

[54] APPARATUS HAVING A MAGNETIC TURNAROUND ROLLER TO REDUCE MAGNETOSTRICTIVE KNOCKDOWN

[75] Inventor: Frederick J. Jeffers, Escondido, Calif.

[73] Assignee: Eastman Kodak Company, Rochester, N.Y.

[21] Appl. No.: 824,045

[22] Filed: Jan. 30, 1986

[51] Int. Cl.⁴ .................. G11B 15/61; G11B 15/60
[52] U.S. Cl. ..................... 360/130.2; 360/130.21; 360/130.22; 360/83; 360/90
[58] Field of Search .......... 360/130.2, 130.21–130.24, 360/90, 87, 83, 84, 85

[56] References Cited

U.S. PATENT DOCUMENTS

| | | | |
|---|---|---|---|
| 3,869,711 | 3/1975 | Bernard et al. | 360/17 |
| 4,031,558 | 8/1975 | Kusaka | 360/130.24 |
| 4,163,266 | 7/1979 | Tamamura et al. | 360/130.21 |

FOREIGN PATENT DOCUMENTS

| | | | |
|---|---|---|---|
| 58-17514 | 2/1983 | Japan | 360/130.21 |
| 607266 | 5/1978 | U.S.S.R. | 360/130.23 |

Primary Examiner—A. J. Heinz
Assistant Examiner—Matthew J. Bussan
Attorney, Agent, or Firm—Robert F. Cody

[57] ABSTRACT

An apparatus is disclosed having means for shunting demagnetization fields to prevent "magnetostrictive knockdown" of a signal recorded on an isotropic recording medium.

4 Claims, 1 Drawing Sheet

APPARATUS HAVING A MAGNETIC TURNAROUND ROLLER TO REDUCE MAGNETOSTRICTIVE KNOCKDOWN

1. Field of the Invention

The present invention relates in general to magnetic recording, and in particular to recording apparatus having means for reducing signal knockdown.

2. Background of the Invention

Advances in the art of magnetic recording have led to the development of a magnetic recording medium having both cubic crystalline as well as acicular shape anisotropy. Such a magnetic recording medium exhibits magnetic isotropy as to coercity and intensity of remanent magnetization, i.e. the magnetic medium exhibits coercivities that are substantially the same along three mutually perpendicular axes. An example of the abovedescribed isotropic magnetic recording medium is disclosed in U.S. Pat. No. 4,451,535.

Isotropic magnetic recording media are especially useful when recording short wavelength signals using "microgap recording" (magnetic record gap $12\mu''$; see for example U.S. Pat. No. 4,302,790) where the vertical component of the magnetic flux vector, i.e. the vector perpendicular to the plane of the magnetic recording medium, provides significant contribution. Isotropic recording media are responsive to both the vertical, as well as the longitudinal, components of the magnetic field from the record head and therefore provide greater signal at high recording density.

Problems with signal reduction, however, have been experienced with isotropic recording media in the form of magnetic tape. The main source of the signal reduction or knockdown is apparently due to a magnetostriction effect. The knockdown due to magnetostriction occurs when the magnetic particles of the isotropic tape are subjected to a uniaxial physical strain. When the magnetic tape is compressed in one direction, the coercivity along the axis of the compression increases while the coercivity in the two axes perpendicular to the compression decreases. This unbalanced change in the anisotropy fields allows easier switching of the magnetic particles of the isotropic tape. If demagnetization fields exist when the strain is applied, signal knockdown occurs. The magnetic particles of the isotropic magnetic tape are subjected to a uniaxial physical strain sufficient to cause "magnetostrictive knockdown" when the tape is wrapped around a member such as the turnaround roller or post of a tape transport mechanism.

The problem then, which is the basis for the present invention, is to prevent magnetostrictive knockdown in an isotropic magnetic recording tape caused by passing the tape over a turnaround roller or post.

SUMMARY OF THE INVENTION

The present invention resides in the realization that if demagnetization fields are not present when a magnetic medium is subjected to a uniaxial physical strain, then the magnetic particles of the magnetic medium will not switch and demagnetization will be avoided. In a presently preferred embodiment, the invention provides a neat and simple means for reducing demagnetization fields by employing—as part of an appropriate tape handling apparatus—a magnetic turnaround roller(s) or post(s) that serve to shunt the deleterious demagnetization fields.

With the above as background reference should now be had to the following figures and the accompanying detailed description of the invention.

DETAILED DESCRIPTION

Figure 1:
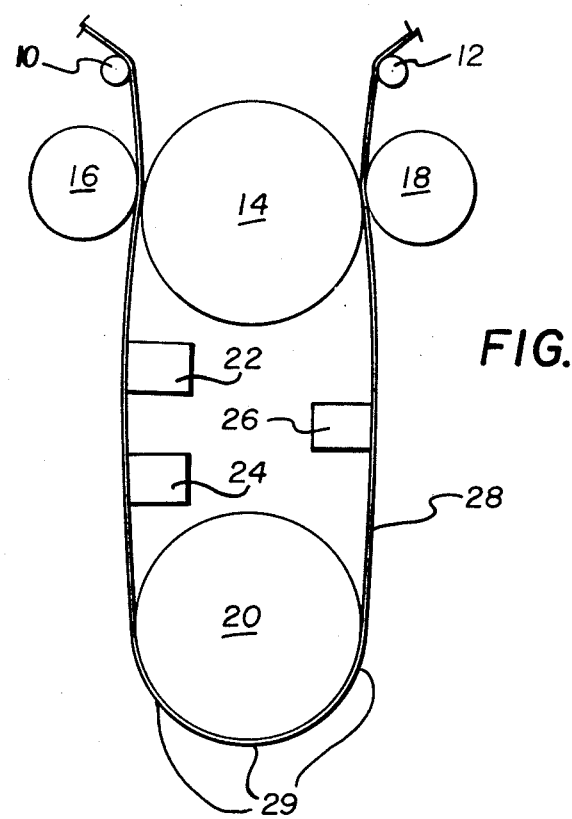
FIG. 1 is a diagram of a tape transport mechanism embodying the present invention.

Referring now to FIG. 1 of the drawings, a closed-loop magnetic tape transport mechanism is shown having idler rollers 10 and 12, a capstan 14, pressure rollers 16 and 18, and a turnaround roller 20. An erase head 22, a write head 24, and a read head 26 are located on the inside of a loop formed by an isotropic magnetic tape 28.

Figure 2:
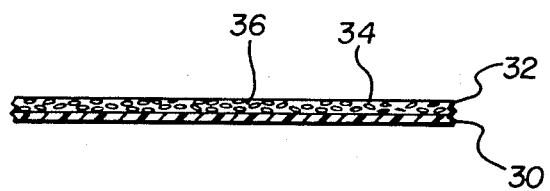
FIG. 2 is a cross-sectional view of an isotropic recording medium.

The isotropic magnetic tape 28, as shown in FIG. 2, is composed of a support layer 30 that is coated with a magnetic recording layer 32 containing magnetic particles 34 dispersed in a binder 36. The magnetic particles 34 typically have a maximum acicularity (length to diameter ratio) of about 2.5 giving the particles 34 a stubby "football" shape. The recording layer 32 exhibits magnetic isotropy as to coercivity and intensity of remanent magnetization. As previously mentioned, an example of an isotropic magnetic medium is disclosed in U.S. Pat. No. 4,451,535.

When the magnetic tape 28 is wrapped around the turnaround roller 20, the magnetic layer is on the inside of the circle and hence is compressed resulting in a physical change in the shape of the magnetic particles 34. Maximum compression of the tape takes place at points 29 (see FIG. 1).

The compression of the particles 34 causes the coercivity of the particles to increase along the axis of the compression (axis parallel to the length of the tape 28) while the coercivity along the two axes perpendicular to the compression (i.e. the axes in the plane of the magnetic tape 28) decreases. The unbalanced change in the three anisotrophy fields of the particle 34 causes switching in the presence of demagnetization fields, resulting in signal knockdown.

This "magnetostrictive knockdown" is prevented by forming the turnaround roller 20 out of a magnetic material, for example permalloy, or some other material with a permeability of at least about 3, instead of the nonmagnetic materials typically used for the roller such as stainless steel. The magnetic turnaround roller 20 does not prevent the change in coercivity when the magnetic particles 34 are subjected to the uniaxial physical strain, but does prevent the particle 34 from switching by shunting the demagnetization fields through the roller 20, thus preventing signal knockdown. Once the particles 34 are past the pressure point 29, they return to their normal shape and the returning demagnetization fields cause no knockdown.

The invention has been described with reference to certain preferred embodiments thereof, but it will be understood that variations and modifications can be effected within the spirit and scope of the invention. For example, the turnaround roller 20 could be constructed by coating a nonmagnetic material with a magnetic layer. In addition, the capstan, preferably, should also be magnetic. Indeed, if possible, all parts of the transport (or cassette) that touch the coated surface of the tape should be magnetic. The coercivity of the magnetic material should be small. The permeability should be high, although a permeability as low as 3 will provide some benefit.

What is claimed is:

1. In an apparatus for transporting a magnetic recording medium having at least one member that exerts a force on said medium sufficient to cause magnetostriction knockdown, the improvement wherein said member is comprised of a magnetic material in the form of a continuous surface that bears against said member for substantially the full travel of said medium over said member, the magnetic permeability of said magnetic material being at least equal to the dimensionless number three.

2. In an apparatus for transporting a magnetic recording medium having a plurality of rollers or posts wherein at least one roller or post exerts a force on said medium sufficient to cause magnetostriction knockdown, the improvement comprising said roller or post being coated with a magnetic material said coating of magnetic material being such that it bears continuously against said roller or post for substantially the full travel of said medium over said roller or post, the magnetic permeability of said material being at least equal to the dimensionless number three.

3. An apparatus for transporting a magnetic recording medium along a medium transport path, said apparatus comprising:

(a) drive means for driving said magnetic recording medium along said medium transport path, and (b) means for chaning the direction of said magnetic recording medium along said transport path wherein said means exerts a force on said recording medium, said means being comprised of a magnetic material in the form of a continuous surface that bears against said member for substantially the full travel of said medium over said member, the magnetic permeability of said magnetic material being at least equal to the dimensionless number three.

4. An apparatus for transporting a magnetic recording medium along a medium transport path, said apparatus comprising:

(a) drive means for driving said magnetic recording medium along said medium transport path, (b) roller means for changing the direction of said magnetic recording medium along said transport path, said roller means cooperating with said medium and exerting thereupon a uniaxial force, said roller means being coated with a magnetic material having a magnetic permeability that is at least equal to the dimensionless number three, said coating of magnetic material being such that it bears continuously against said roller for substantially the full travel of said medium over said roller.

* * * * *